United States Patent
Kubota et al.

(10) Patent No.: US 7,929,186 B2
(45) Date of Patent: Apr. 19, 2011

(54) IMAGE READING APPARATUS AND IMAGE RECORDING APPARATUS

(75) Inventors: Hirotaka Kubota, Vancouver, WA (US); Masaki Higashiura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 999 days.

(21) Appl. No.: 11/475,896

(22) Filed: Jun. 28, 2006

(65) Prior Publication Data

US 2007/0002400 A1    Jan. 4, 2007

(30) Foreign Application Priority Data

Jun. 29, 2005   (JP) .................................. 2005-190483

(51) Int. Cl.
*H04N 1/40* (2006.01)
*H04N 1/04* (2006.01)
*G06K 15/00* (2006.01)

(52) U.S. Cl. ..................... 358/474; 358/1.12; 358/449

(58) Field of Classification Search .......... 399/361–402; 358/486, 474, 496, 497, 462, 449, 450, 452–453, 358/473, 484, 487, 488, 505, 408, 1.12
See application file for complete search history.

(56) References Cited

U.S. PATENT DOCUMENTS

| 6,118,972 A * | 9/2000 | Yamazaki et al. ............ 399/370 |
| 6,549,302 B1 * | 4/2003 | Takeda et al. .................. 358/1.9 |
| 2003/0202010 A1 * | 10/2003 | Kerby et al. .................. 345/744 |
| 2005/0111894 A1 * | 5/2005 | Hosoi .......................... 399/371 |

FOREIGN PATENT DOCUMENTS

| JP | 4-150560 A | 5/1992 |
| JP | 7-239586 A | 9/1995 |
| JP | 2002-10059 A | 1/2002 |
| JP | 2005-159766 A | 6/2005 |
| JP | 2007-13378 A | 1/2007 |

* cited by examiner

Primary Examiner — Jerome Grant, II
(74) Attorney, Agent, or Firm — Birch, Stewart, Kolasch & Birch, LLP

(57) ABSTRACT

An image reading apparatus capable of reading images according to a plurality of reading methods, comprising a manuscript table on which manuscripts are placed, a reading section for reading images from the manuscripts placed on the manuscript table, and a plurality of detecting sections for detecting the manuscripts placed on the manuscript table, wherein an image reading method is determined according to the detection states of the respective detecting sections, and the images of the manuscripts are read using the reading section according to the determined reading method.

17 Claims, 11 Drawing Sheets

| X1Y1 | X2Y1 | X1Y2 | X2Y2 | S1 | S2 | S3 | S4 |
|------|------|------|------|----|----|----|----|
| O    | ×    | O    | ×    | ×  | O  | ×  | ×  |

IMAGE READING APPARATUS AND IMAGE RECORDING APPARATUS

CROSS-REFERENCE TO RELATED APPLICATIONS

This Nonprovisional application claims priority under 35 U.S.C. §119(a) on Patent Application No. 2005-190483 filed in Japan on Jun. 29, 2005, the entire contents of which are hereby incorporated by reference.

BACKGROUND OF THE INVENTION

1. Field of the Invention

The present invention relates to an image reading apparatus and an image recording apparatus, in which a plurality of manuscripts being placed on a manuscript table are read by one scanning operation and then processed.

2. Description of Related Art

When manuscripts are read in the manuscript reading apparatus of a conventional copying machine, manuscripts are conventionally read using a manuscript table or an automatic manuscript feeder. In the case that a plurality of manuscripts are read using a manuscript table and that the images of a plurality of pages are output to one sheet of paper, the user is requested to arrange the manuscripts so as not to be misaligned, in order to obtain an aligned output. For this reason, it takes time to arrange the manuscripts so as to be aligned properly, thereby being inconvenient for the user.

For the purpose of solving this problem, a conventional manuscript reading apparatus uses an automatic manuscript reading apparatus in which two manuscripts are aligned on a manuscript table during feeding, whereby the images of the two manuscripts are output so as to be aligned on a sheet of paper (for example, Japanese Patent Application Laid-Open No. 07-239586).

Furthermore, another manuscript reading apparatus has also been proposed, in which a plurality of manuscripts being placed carelessly on a manuscript table are collectively read as an image, the edges of the manuscripts are detected from the image, skew correction is carried out when the manuscripts are rectangular, the respective manuscripts are extracted from the input image, and then output processing is carried out (for example, Japanese Patent Application Laid-Open No. 2002-10059).

However, in the method described in Japanese Patent Application Laid-Open No. 07-239586, an automatic manuscript reading apparatus is required, and the way of placing manuscripts is the same as that in ordinary copying. In the case that manuscript reading is carried out using, the above-mentioned reading method, the user is always required to perform mode setting manually. This has a problem of causing inconvenience to the user.

Furthermore, in the method described in Japanese Patent Application Laid-Open No. 2002-10059, although manuscript arrangement is done as desired, it is necessary that the image of the whole manuscript table is once stored in a buffer, that the image is subjected to edge detection processing and clipping processing, and that the clipped image is subjected to skew correction. This has a problem of occupying large amounts of the memory source and CPU source.

BRIEF SUMMARY OF THE INVENTION

In view of the circumstances described above, an object of the present invention is to provide an image reading apparatus and an image recording apparatus, comprising a plurality of detecting means for detecting manuscripts placed on a manuscript table, and being configured so that an image reading method is determined according to the detection states of the respective detecting means, thereby being capable of selectively using, for example, a method of is reading a plurality of manuscripts as one image or a method of individually reading the respective images of a plurality of manuscripts, without receiving user's mode setting.

Another, object of the present invention is to provide an image reading apparatus and an image recording apparatus, being configured so that the manuscript table has a rectangular shape and so that the detecting means for detecting manuscripts placed near the respective corners of the manuscript table are provided, thereby being capable of individually reading the respective images of a plurality of manuscripts, without occupying large amounts of the memory source and CPU source.

The image reading apparatus according to the present invention comprises a manuscript table on which one or more manuscripts are placed, a reading section for reading images from the manuscripts placed on said manuscript table, a plurality of detecting sections for detecting the manuscripts placed on said manuscript table, and a controller capable of performing operations of: determining a reading method based on the detecting states of said respective detecting sections; and causing said reading section to read the images of the manuscripts by the determined reading method.

According to the present invention, the a plurality of detecting means for detecting manuscripts placed on the manuscript table are, provided, and an image reading method is determined according to the detection states of the respective detecting means. Hence, a reading method is determined automatically according to the number of manuscripts and the placement states of the manuscripts detected using the detecting means.

The image reading apparatus according to the present invention is characterized in that the manuscript table has a rectangular shape, and said detecting sections are provided to detect manuscripts placed near the respective corners of said manuscript table.

According to the present invention, the manuscript table having a rectangular shape is used, and the detecting means are provided to detect manuscripts placed near the respective corners of the manuscript table. Hence, the placement positions of the manuscripts are clarified, and the manuscripts can be placed easily in aligned states.

The image reading apparatus according to the present invention is characterized in that the determined reading method is either a method for reading one or more manuscripts as one image or a method for individually reading, the respective images of a plurality of manuscripts.

According to the present invention, either the method for reading one or more manuscripts as one image or the method for individually reading the respective images of a plurality of manuscripts is adopted as a reading method.

The image reading apparatus according to the present invention is characterized in that the controller is further capable of performing an operation of specifying the number of manuscripts placed on said manuscript table based on the detection results of said respective detecting sections.

According to the present invention, the number of manuscripts placed on the manuscript table are specified on the basis of the detection results of the detecting means. Hence, for example, in the case that a plurality of manuscripts are detected, the method for individually reading, the respective images of the manuscripts can be set automatically.

The image reading apparatus according to the present invention is characterized in that the apparatus further comprises a storing section for storing a manuscript reading sequence, and the controller is further capable of performing an operation of causing the reading section to read the images of manuscripts according to the reading sequence stored in said storing section when a plurality of manuscripts are placed on said manuscript table.

According to the present invention, the images of the manuscripts are read according to the reading sequence having been stored. Hence, for example, the images can be read according to the preset reading sequence, or the images can also be read according to the setting having been used immediately before.

The image reading apparatus according to the present invention is characterized in that the apparatus further comprises a receiving section for receiving a setting of the manuscript reading sequence, and the controller is further capable of performing an operation of causing the reading section to read the images of manuscripts according to the setting received at said receiving section when a plurality of manuscripts are placed on said manuscript table.

According to the present invention, the images of the manuscripts are read according to the reading sequence having been set by the user.

The image reading apparatus according to the present invention is characterized in that some of said detecting sections detect the dimensions of the manuscripts placed on said manuscript table.

According to the present invention, the means for detecting the dimensions of manuscripts and the means for detecting the presence of manuscripts can be used together.

The image recording apparatus according to the present invention is characterized in that the apparatus comprises any one of the image reading apparatuses described above, and a recording section for recording images read by said image reading apparatus on a sheet.

According to the present invention, the image recording apparatus is equipped with means for recording images having been read using the image reading apparatus on a sheet. Hence, the apparatus is applicable to an image forming apparatus.

The image recording apparatus according to the present invention is characterized in that the apparatus further comprises a storing section for storing the recording method that is used to record the images, and a controller capable of performing an operation of causing said recording section to record the images by the recording method stored in said storing section.

According to the present invention, the images are recorded according to the recording method, having been stored. Hence, for example the images can be recorded according to the preset recording method or the images can also be recorded according to the setting having been used immediately before.

The image recording apparatus according to the present invention is characterized in that the apparatus further comprises a receiving section for receiving a setting of the recording method that is used to record the images and a controller capable of performing an operation of causing said recording section to record the images according to the setting received at said receiving section.

According to the present invention, images are recorded according to the recording method having been set by the user.

The image recording apparatus according to the present invention is characterized in that the recording method is one of a method for recording an image on one side of a sheet, a method for recording a plurality of images on one side of a sheet, a method for recording images on both sides of a sheet, and a method for recording images as data.

According to the present invention, the method for recording an image on one side of a sheet, the method for recording a plurality of images on one side of a sheet, the method for recording images on both sides of a sheet, or a method for recording images as data is adopted as a recording method.

In the present invention, a plurality of detecting means for detecting manuscripts placed on the manuscript table are provided, and an image reading method is determined according to the detection states of the respective detecting means. Hence, a reading method is determined automatically according to the number of manuscripts and the placement states of the manuscripts detected using the detecting means. Hence, even if no automatic manuscript feeder is mounted, a plurality of pages of manuscripts can be read automatically.

In the present invention, the manuscript table having a rectangular shape is used, and the detecting means for detecting manuscripts placed near the respective corners of the manuscript table are provided. Hence, a plurality of pages of manuscripts can be read automatically by placing a plurality of manuscripts using the four corners of the manuscript table.

In the present invention, either the method for reading one or more manuscripts as one image or the method for individually reading the respective images of a plurality of manuscripts is adopted as a reading method. Hence, a plurality of manuscripts can be read as one manuscript as in the conventional case, or can also be read as a plurality of pages.

In the present invention, the number of manuscripts placed on the manuscript table are specified on the basis of the detection results of the respective detecting means. Hence, for example, in the case that a plurality of manuscripts are detected, the method for individually reading the respective images of the manuscripts can be set automatically.

In the present invention, the images of the manuscripts are read according to the reading sequence having been stored. Hence, for example, the images can be read according to the preset reading sequence, or the images can also be read according to the setting having been used immediately before. Hence, even if no reading sequence is set by the user, reading processing can be carried out, and user's burden for operation can be reduced.

In the present invention, the images of the manuscripts are read according to the reading sequence having been set by the user. Hence, processing can be carried out in a state desired by the user.

In the present invention, the means for detecting the dimensions of manuscripts and the means for detecting the presence of manuscripts can be used together. Hence, the number of manuscripts on the manuscript table and the placement states of the manuscripts can be detected using these means.

In the present invention, the image recording apparatus is equipped with means for recording images having been read using the image reading apparatus on a sheet. Hence, the apparatus is applicable to an image forming apparatus.

In the present invention, the images are recorded according to the recording method having been stored. Hence, for example, the images can be recorded according to the preset recording method, or the images can also be recorded according to the setting having been used immediately before. Hence, even if no recording method is set by the user, processing can be carried out, and user's burden for operation can be reduced.

In the present invention, images are recorded according to the recording method having been set by the user. Hence, the images are output in a state desired by the user.

In the present invention, the method for recording an image on one side of a sheet, the method for recording a plurality of images on one side of a sheet, the method for recording images on both sides of a sheet, or a method for recording images as data is adopted as a recording method.

DETAILED DESCRIPTION OF THE INVENTION

Figure 1C:
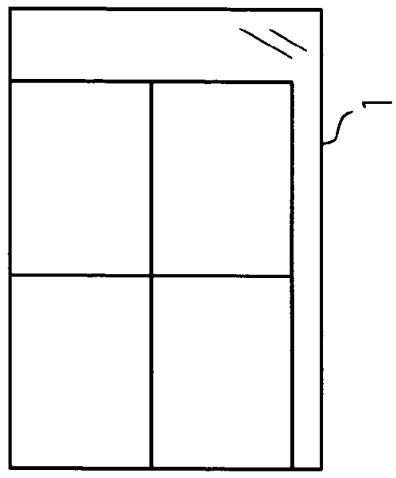
FIGS. 1A to 1D are schematic views showing arrangement examples of manuscripts at the time when a plurality of manuscripts are read using a scanning function.
Figure 1D:
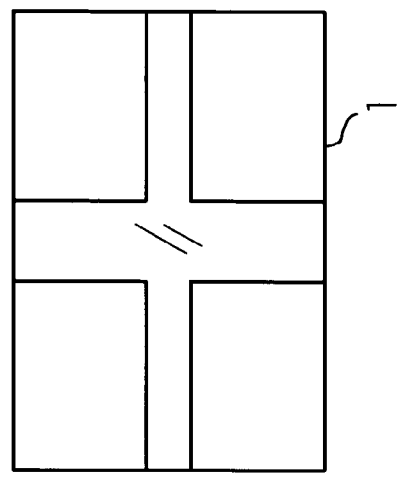

An image reading apparatus and an image recording apparatus according to the present invention, being applied to a digital combined apparatus having a scanning function, a copying function, a printing function, etc., will be described below specifically referring to the drawings.

Figure 1A:
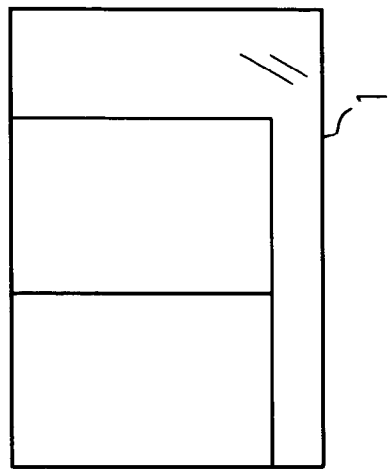

FIGS. 1A to 1D are schematic views showing arrangement examples of manuscripts at the time when a plurality of manuscripts, are read using a scanning function. The digital combined apparatus according to, an embodiment of the present invention comprises an image reading apparatus 10 and an image recording apparatus 20 (see FIG. 7). The image reading apparatus 10 is provided, with a manuscript table 1 being made of glass and having an appropriate area so that two A4 size manuscripts or four is B5 size manuscripts can be placed, for example. FIG. 1A shows a state in which two manuscripts are placed on the manuscript table 1. In this case, the two manuscripts are placed on the manuscript table 1 in a state in which the two manuscripts are arranged so as to make contact with each other. When reading these manuscripts, the image reading apparatus 10 reads the images of the respective manuscripts as one image. In other words, even if two manuscripts are placed, the images of the respective manuscripts are not read individually. Hence, a piece of image data is generated in the image reading apparatus 10.

Figure 1B:
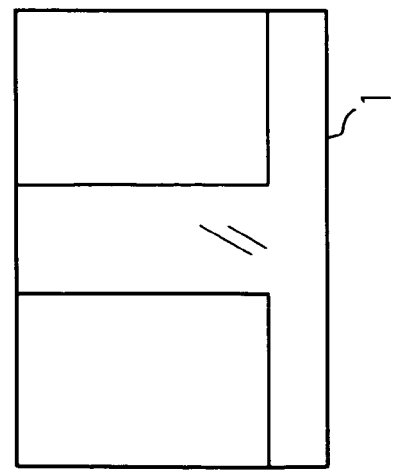

On the other hand, in the arrangement example shown in FIG. 1B, two manuscripts are placed on the manuscript table 1 so as to be separated from each other. More specifically, a first manuscript is placed so as to be aligned with the upper left corner of the manuscript table 1, and a second manuscript is placed so as to be aligned with the upper right corner of the manuscript table 1. In the case that the two manuscripts are placed in the state described above, the image reading apparatus 10 according to this embodiment reads the images of the respective manuscripts individually. In other words, in the case that two manuscripts are read using the manuscript table 1 according to a conventional method, the following procedure is required to be carried out. That is, after a first manuscript is placed so as to be aligned with the upper left corner of the manuscript table 1, manuscript reading processing is carried out. Then, the first manuscript is removed, a second manuscript is placed similarly, and manuscript reading processing is carried out again. In the case of this embodiment, however, reading can be done by placing two manuscripts as shown in FIG. 1B and by carrying out reading processing similar to that described above only once. In this description, the front side of the manuscript table 1 as viewed from the user who uses the manuscript, table 1 is referred to as the "lower" side, and the rear side thereof is referred to as the "upper" side.

Reading processing even in the case that two or more manuscripts are placed is similar to that described above. FIG. 1C shows an arrangement example in which four manuscripts are placed on the manuscript table 1, with no space among them. In this case, the images of the four, manuscripts are not read individually but are read as one image obtained by the combination of the images of the respective manuscripts, as in the conventional reading processing. On the other hand, in the arrangement example shown in FIG. 1D, four manuscripts are placed so as to be aligned with the four corners of the manuscript table 1, respectively, and so as to be separated from one another. In the case that the four manuscripts are placed in this state, the image reading apparatus 10 according to this embodiment reads the images of the respective manuscripts individually. Hence, in the arrangement shown in FIG. 1C, the image reading apparatus 10 generates one piece of image data. However, in the arrangement shown in FIG. 1D, the image reading apparatus 10 generates four pieces of image data corresponding to the images of the respective manuscripts.

Figure 2:
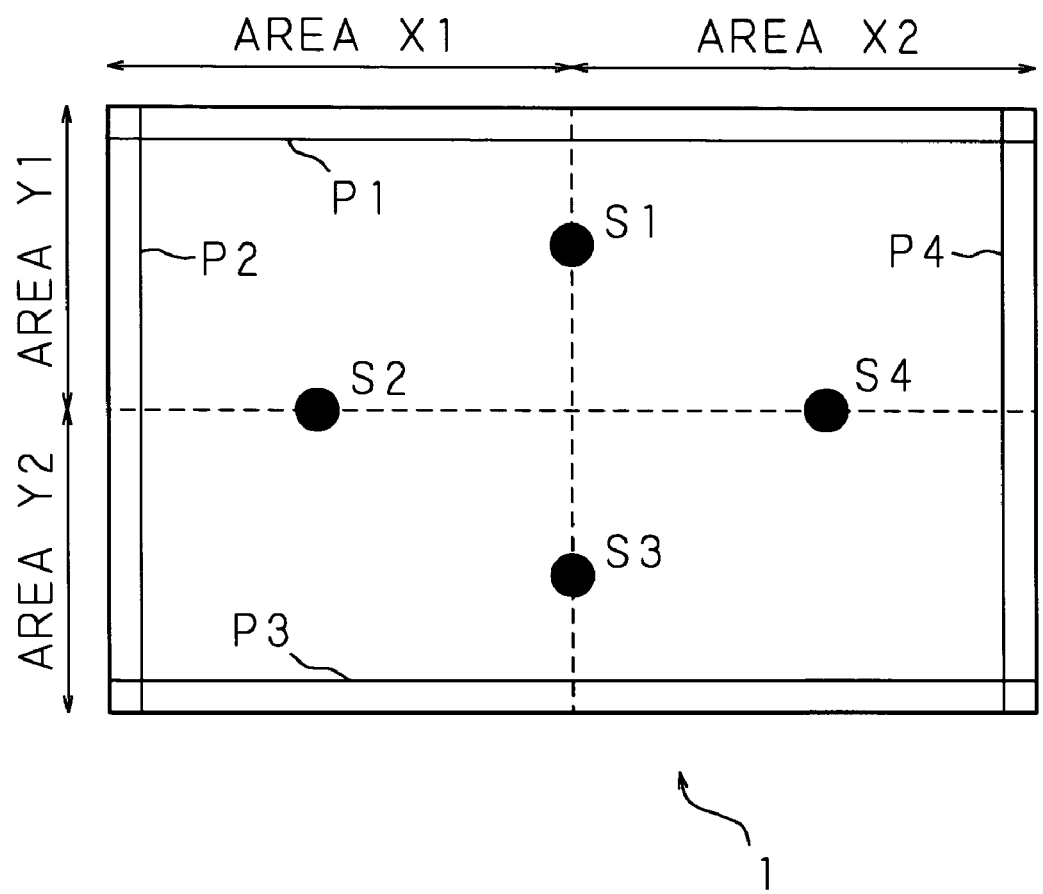
FIG. 2 is a schematic view showing an installation example of respective sensors.

The number of manuscripts placed on the manuscript table 1 and the placement states thereof are judged on the basis of the detection states of a plurality of sensors that are used to detect the manuscripts. FIG. 2 is a schematic view showing an installation example of the respective sensors. In this embodiment, two kinds of sensors are used. Manuscript size detection sensors P1 to P4 being used to detect the size of a manuscript are categorized as one type of sensors, and they are disposed at the upper end, the left end, the lower end and the right end, respectively. Manuscript detection sensors S1 and S4 being used to detect whether a manuscript is present or not thereabove are categorized as the other type of sensors. Both the manuscript detection sensors S1 and S3 are installed on the centerline between the left and right ends of the manuscript table 1. The manuscript detection sensor S1 is disposed at the ¼ position from the above, and the manuscript detection sensor S3 is disposed at the ¾ position from the above. Furthermore, both the manuscript detection sensors S2 and S4 are installed on the centerline between the upper and lower ends of the manuscript table 1. The manuscript detection sensor S2 is disposed at the ¼ position from the left, and the manuscript detection sensor S4 is disposed at the ¾ position from the left. Known optical sensors can be used as the manuscript size detection sensors P1 to P4 and the manuscript detection sensors S1 and S4.

Figures 3A, 3B:
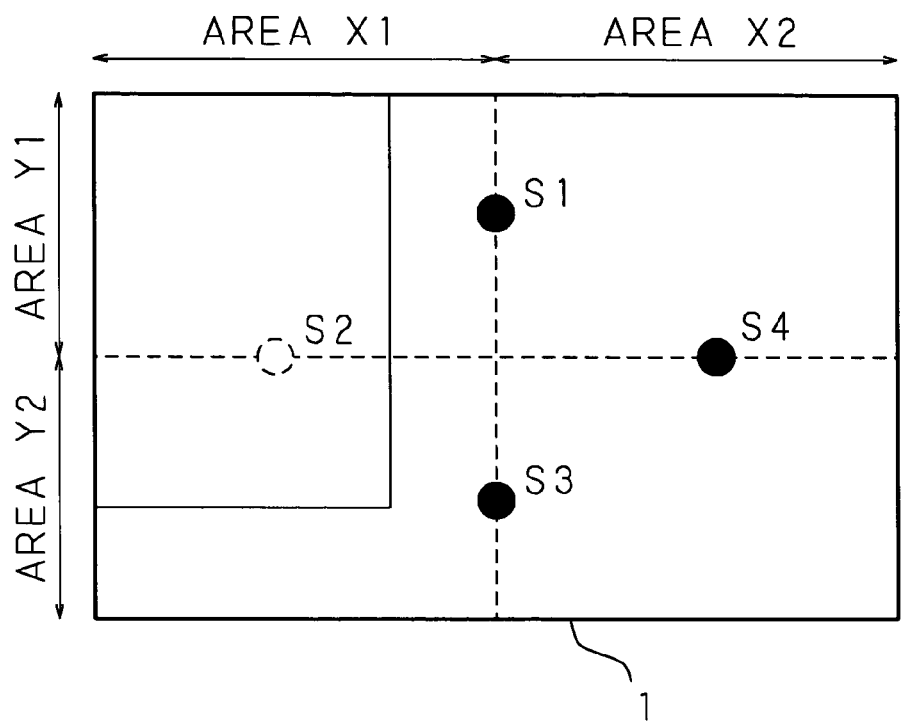
FIGS. 3A and 3B are schematic views showing a manuscript detection example in an image reading apparatus.

FIGS. 3A to 6B are schematic views showing manuscript detection examples in the image reading apparatus 10. FIG. 3A is a schematic view showing a state, in which one manuscript is placed at the upper left corner of the manuscript table 1. In this case, the manuscript detection sensor S2 is turned ON, and the other manuscript detection sensors S1, S3 and S4 are turned OFF. In addition, on the basis of the outputs of the manuscript size detection sensors P1 and P2, it is, detected that the placed manuscript is in the common area of areas X1 and Y1 and in the common area of areas X1 and Y2 (see FIG. 3B). In the table shown in FIG. 3B, the state in which a manuscript is, present is represented by ",," and the state in which no manuscript is present is represented by "x."

Figures 4A, 4B:
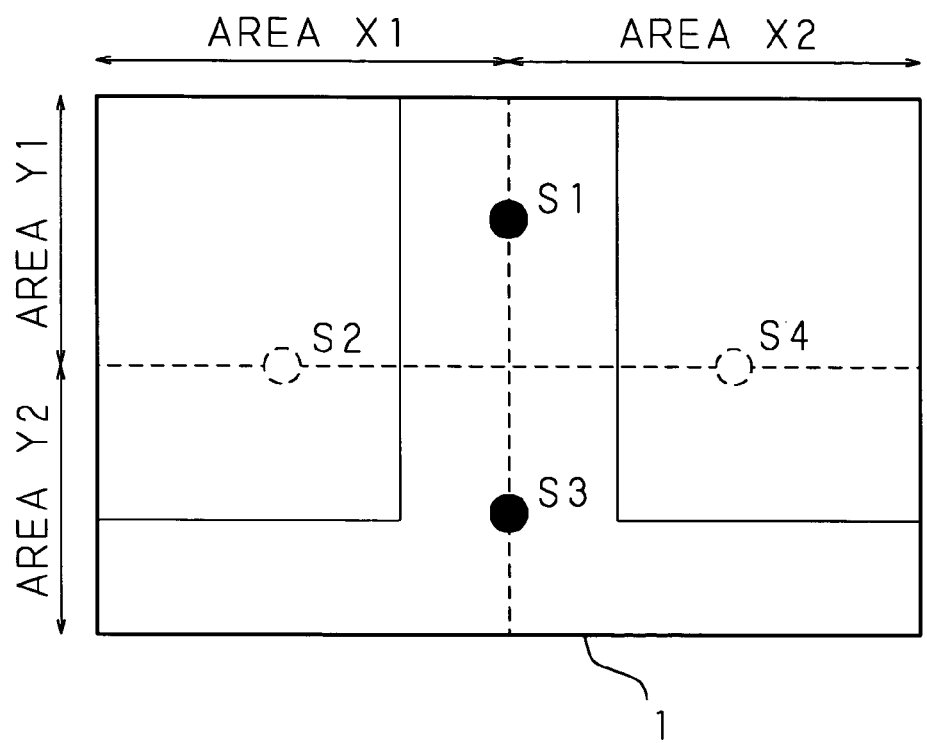
FIGS. 4A and 4B are schematic views showing another manuscript detection example in the image reading apparatus.

FIG. 4A is a schematic view showing a state in which one manuscript is placed at the upper left corner of the manuscript table 1 and another manuscript is placed at the upper right corner of the manuscript table 1. In this case, the manuscript detection sensors S2 and S4 are turned ON, and the other manuscript detection sensors S1 and S3 are turned OFF. In addition, on the basis of the outputs of the manuscript size detection sensors P1 to P3, it is detected that one manuscript is present in the common area of areas X1 and Y1 and in the common area of areas X1 and Y2, and that the other manuscript is present in the common area of areas X2 and Y1 and in the common area of areas X2 and Y2 (see FIG. 4B). Hence, it can be detected that the two manuscripts are placed on the manuscript table 1 in a state of being separated left and right.

Figures 5A, 5B:
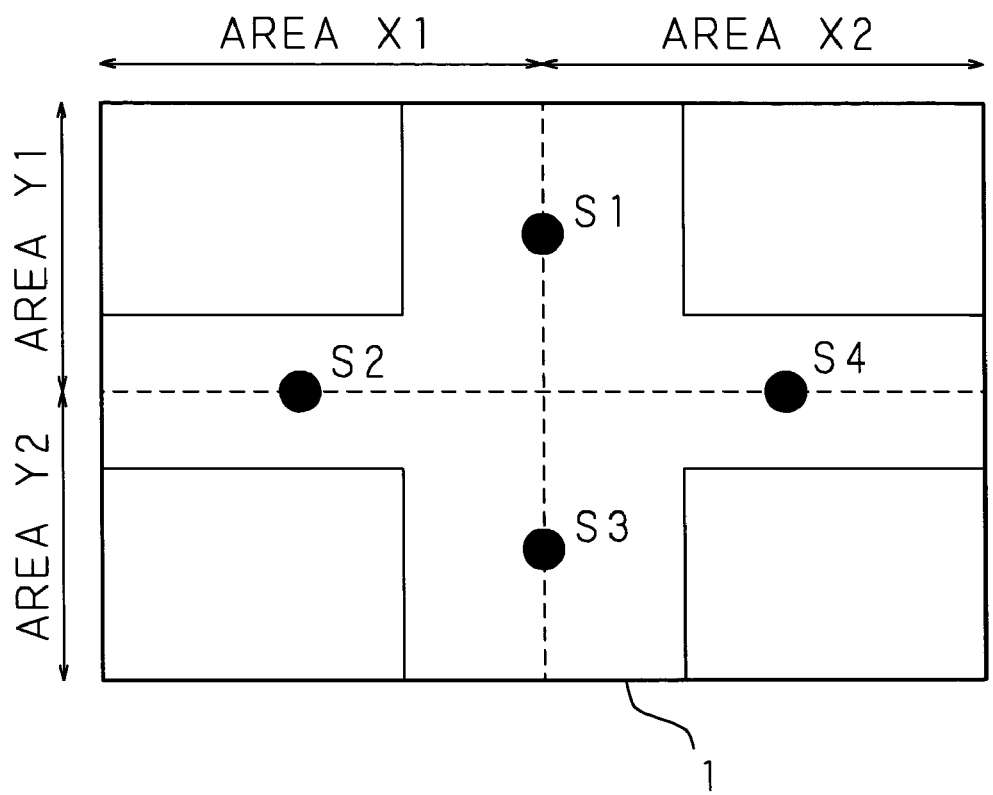
FIGS. 5A and 5B are schematic views showing still another manuscript detection example in the image reading apparatus.

FIG. 5A is a schematic view showing a state in which four manuscripts are placed respectively at the four corners of the manuscript table 1. In this case, the manuscript detection sensors S1 to S4 are turned OFF. In addition on the basis of the outputs of the manuscript size detection sensors P1 to P4, it is detected that one manuscript is present in each of the common area of areas X1 and Y1, the common area of areas X1 and Y2, the common area of areas X2 and Y1, and the common area of areas X2 and Y2 (see FIG. 5B). Hence, it can be detected that the four manuscripts are placed on the manuscript table 1 in a state of being separated left and right, and up and down.

Figures 6A, 6B:
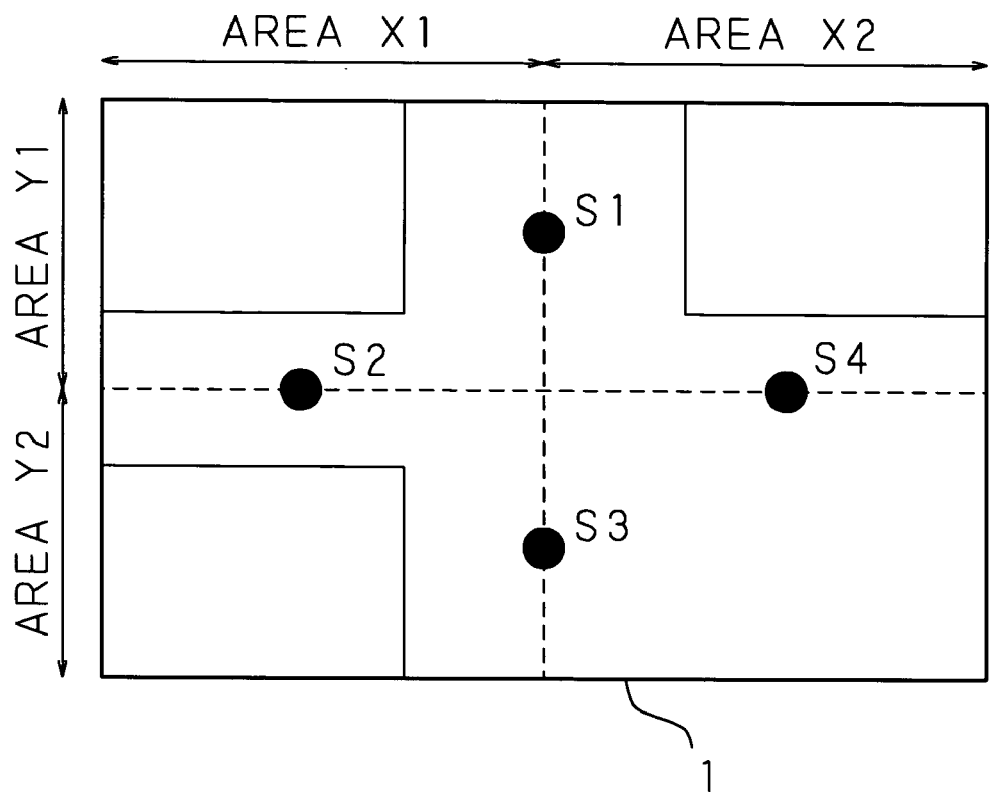
FIGS. 6A and 6B are schematic views showing yet still another manuscript detection example in the image reading apparatus.

FIG. 6A is a schematic view, showing a state in which three manuscripts are placed respectively at the three corners other than the lower right corner of the manuscript table 1. In this case, the manuscript detection sensors S1 to S4 are turned OFF as in the case shown in FIGS. 5A and 5B. In addition, on the basis of the outputs of the manuscript size detection sensors P1 to P4, it is detected that one manuscript is present in each of the common area of areas X1 and Y1, the common area of areas X1 and Y2, and the common area of areas X2 and Y1 (see FIG. 6B). Hence, it can be detected that the three manuscripts are placed respectively at the three corners other than the lower right corner of the manuscript table 1 in a state of being separated left and right, and up and down.

In this embodiment, by the combined use of the manuscript detection sensors S1 and S4 and the manuscript size detection sensors P1 to P4, the information regarding the number of manuscripts being placed on the manuscript table 1 and the information regarding the placement states of the manuscripts can be obtained easily.

Figure 7:
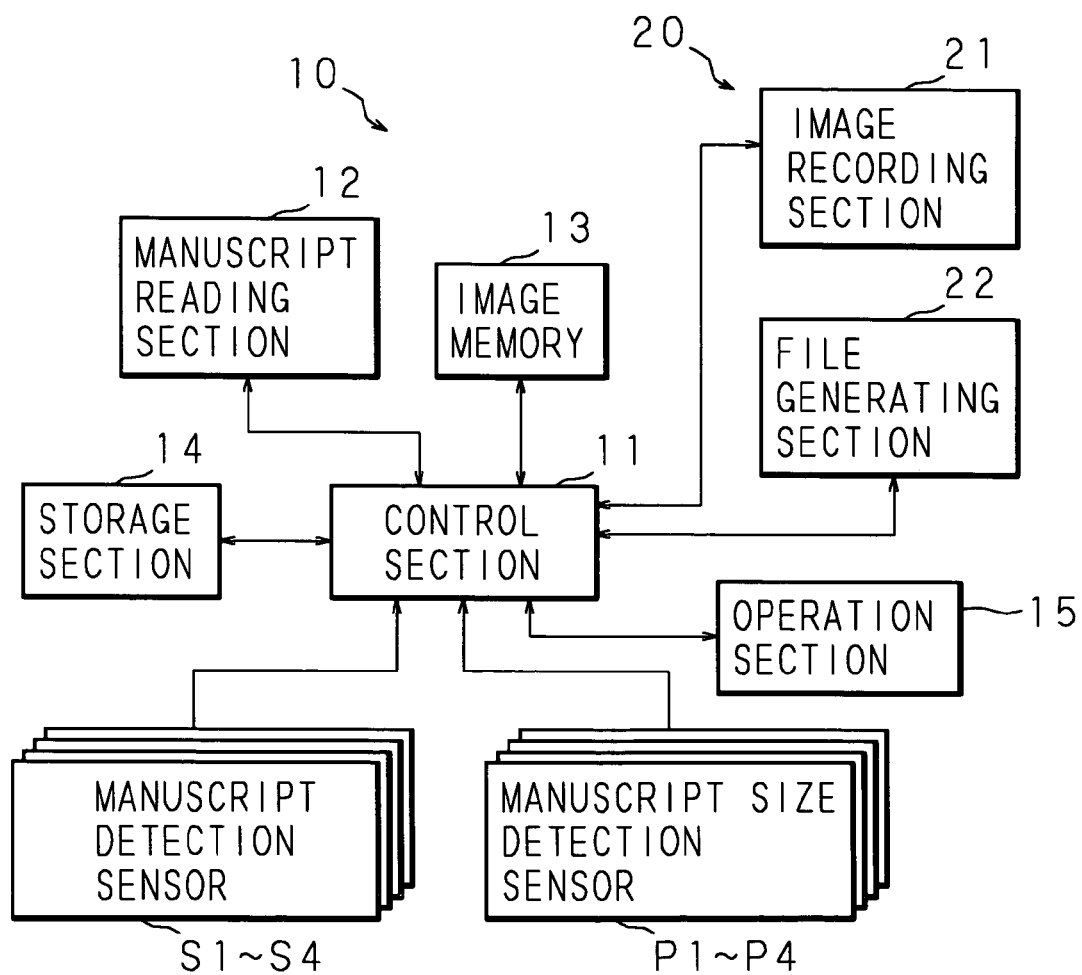
FIG. 7 is a block diagram showing the configuration of the control method of a digital combined apparatus according to this embodiment.

FIG. 7 is a block diagram showing the configuration of the control method of the digital combined apparatus according to this embodiment. The digital combined apparatus according to this embodiment comprises the image reading apparatus 10 and the image recording apparatus 20 as described above. The image reading apparatus 10 comprises a control section 11, a manuscript reading section 12, an image memory 13, a storage section 14, an operation section 15, the manuscript detection sensors S1 and S4, and the manuscript size detection sensors P1 to P4. Furthermore, the image recording apparatus 20 comprises an image recording section 21, and a file generating section 22.

The control section 11 comprises a CPU and a ROM. The CPU executes control programs having been stored beforehand in the ROM. Consequently, the above-mentioned hardware sections are controlled, and the whole apparatus is operated as the image reading apparatus and the image recording apparatus according to the present invention.

The manuscript reading section 12 comprises the manuscript table 1 made of glass on which manuscripts to be read are placed, a light source that applies light to the manuscripts placed on the manuscript table 1, an image sensor formed of a CCD (charge coupled device) or the like, and an AD converter. The image of a manuscript being set at a predetermined reading position is formed on the image sensor and converted into an analog electrical signal, and the obtained analog electrical signal is AD-converted using the AD converter. The manuscript reading section 12 generates the image data of each page by correcting the digital signal obtained by AD conversion with respect to the orientation characteristic of the light source, the uneven sensitivity of the image sensor, etc. during manuscript reading.

The image memory 13 temporarily stores the image data of each page, which is generated using the manuscript reading section 12. The image data stored in the image memory 13 is read according to a command from the control section 11 and is transferred to a destination designated, using the control section 11. In other words, in the case that output processing is completed by recording an image on a sheet of paper or OHP film, the image is transferred to the image recording section 21 of the image recording apparatus 20. In the case that output processing is completed by generating a PDF file or the like, the image is transferred to the file generating section 22.

The storage section 14 is a volatile or nonvolatile semiconductor memory. Information being stored in the storage section 14 is temporary data generated by the above-mentioned control programs, various setting values being input through the operation section 15, etc. This embodiment is configured so as to receive the setting regarding the sequence of manuscript reading and the setting regarding the output format of an image having been read. In the case that these settings are done through the operation section 15, they are stored in the storage section 14.

The operation section 15 is a touch-sensitive operation panel, for example, and comprises an, input section that receives operation commands from the user and a display, section that displays information to be provided for the user. The input section is equipped with various operation buttons that are used to receive operation commands from the user. The input section receives the number of pieces to be printed, the setting values of respective functions, such as copying concentration, etc., the switching operations of respective functions, and execution start commands for respective processing, as well as the setting values regarding the above-mentioned manuscript, reading sequence and the settings regarding the method for, outputting images having been read. The input section receives commands from the user. The display section is equipped with a liquid crystal, display and displays the operation states of the apparatus, various setting values having been input through the input section, information to be provided for the user, etc.

The manuscript detection sensors S1 and S4 and the manuscript size detection sensors P1 to P4 are sensors being used to detect manuscripts placed on the manuscript table 1 as described above. For example, when the sensor S1 (or S2 to S4, P1 to P4) detects a manuscript, the sensor outputs an ON signal to the control section 11. The control section 11 can obtain the number of manuscripts being placed on the manuscript table 1 and the arrangement relationship among them by examining the detection states of the manuscript detection sensors S1 to S4 and the manuscript size detection sensors P1 to P4.

The image recording section 21 records an image on a sheet on the basis of image data transferred from the image memory 13. For this purpose, the image recording section 21 comprises a charger that charges a photoconductive drum to a predetermined potential, a laser writing apparatus that emits laser light according to the image data received from the outside and forms an electrostatic latent image on the photoconductive drum, a developer that supplies toner to the electrostatic latent image formed on the surface of the photoconductive drum to develop the image, and a transfer device that transfers the toner image formed on the surface of the photoconductive drum to, a sheet of paper (these devices are not shown). With this configuration, the image recording section 21 records an imaged desired by the user on a sheet of paper according to the electrophotographic method. The image recording section 21 may also be configured using the ink-jet method, the thermal transfer method, the sublimation method, etc., instead of the electrophotographic method that uses the laser writing apparatus.

The file generating section 22 generates an image file including a manuscript image on the basis of the image data transferred from the image memory 13. The image file being generated includes a PDF files, a TIFF file, a JPEG file, etc. For this purpose, the file, generating section 22 is equipped with a codec that carries out conversion to generate these files from the image data.

Figure 8:
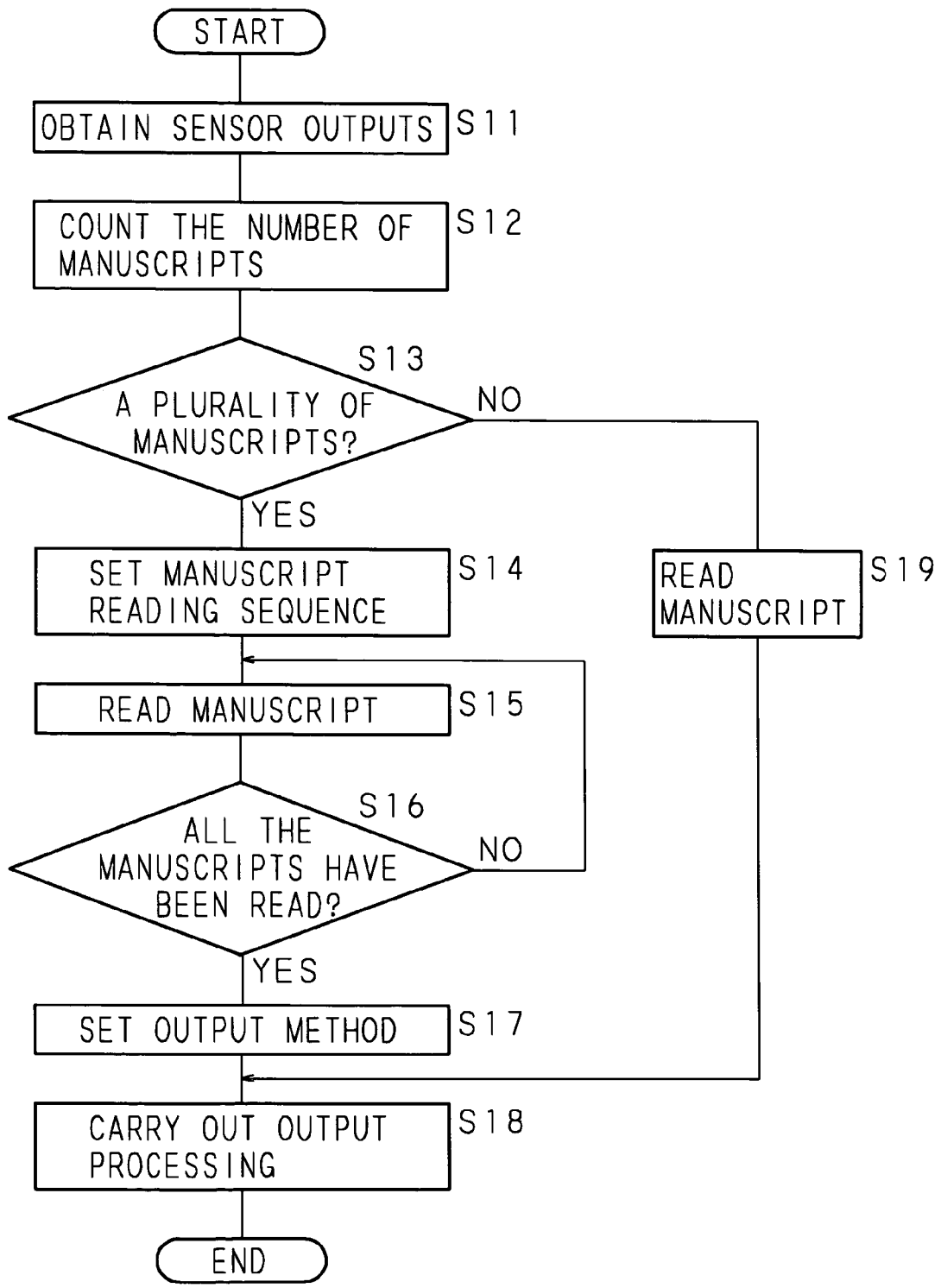
FIG. 8 is a flowchart showing, the processing procedure that is carried out by the digital combined apparatus.

Operations for carrying out manuscript reading processing and output processing on the basis of images having been read, using the digital combined, apparatus configured as described above, will be described below. FIG. 8 is a flowchart showing the processing procedure that is carried output by the digital combined apparatus. In the case that the control section 11 of the digital combined apparatus obtains sensor outputs (at step S11), that is, in the case that the ON signals output, from any of the manuscript detection sensors S1 and S4 and the manuscript size detection sensors P1 to P4 are input to the control section 11, the control section 11 counts the number of manuscripts placed on the manuscript table 1 on the basis of the detection states of the sensors S1 to S4 and P1 to P4 (at step S12).

After the number of manuscripts is counted, the control section 11 judges whether a plurality of manuscripts are placed on the manuscript table 1 (at step S13). In the case that the control section 11 judges that a plurality of manuscripts are placed on the manuscript table 1 (YES at step 513), the control section 11 sets a manuscript reading sequence (at step S14).

Figure 9:
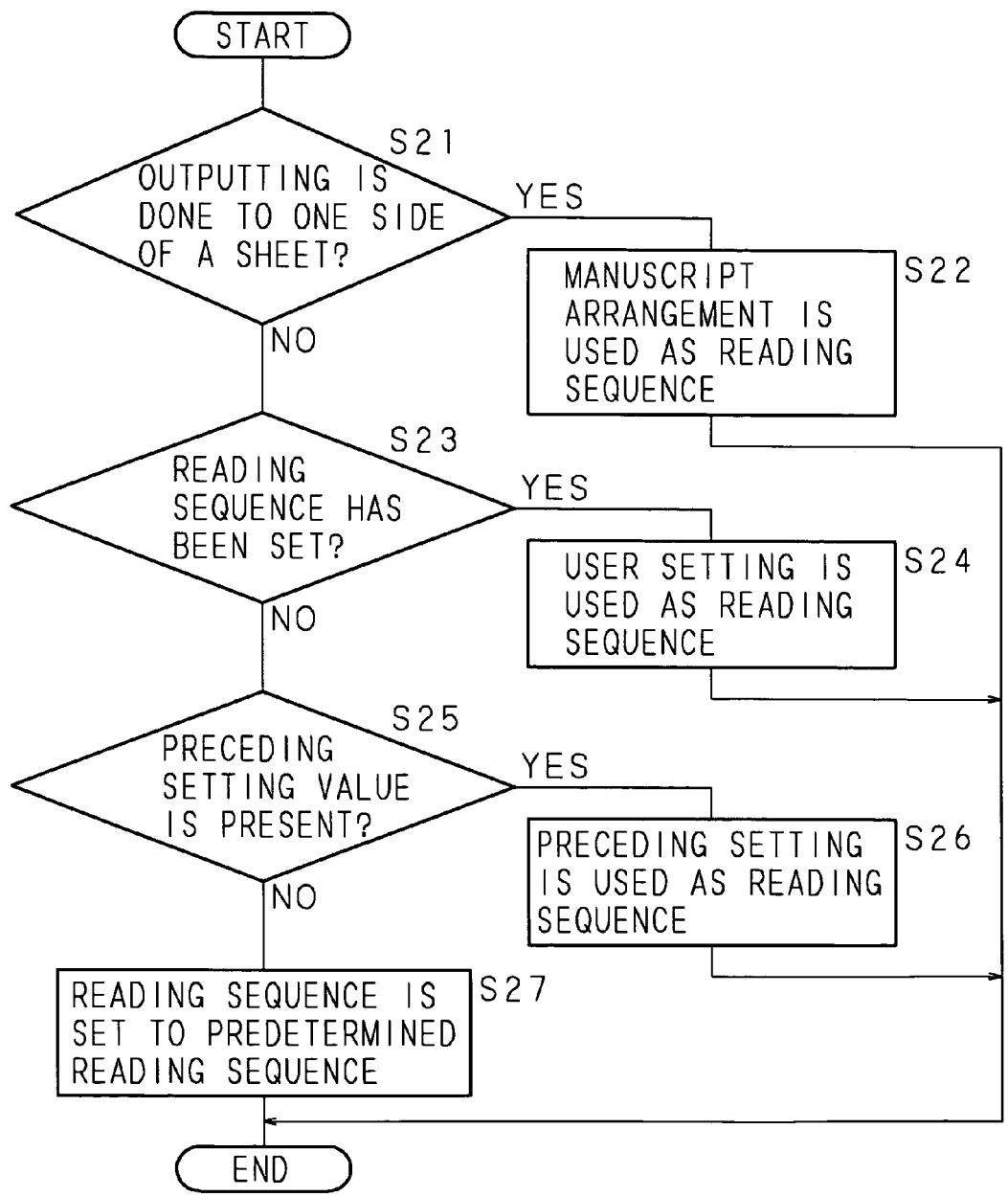
FIG. 9 is a flowchart showing the processing for setting a reading sequence.

FIG. 9 is a flowchart-showing the processing for setting the reading sequence. In the processing for setting the reading sequence, first, a judgment is made as to whether outputting is done to one side of a sheet by the output processing being carried out later (at step S21). In the case that it is judged that outputting is done to one side of a sheet (YES at step S21), the manuscript arrangement a the current moment is used as the reading sequence (at step S22). The reading sequence being set at this step is stored in the storage section 14. On the other hand, in the case that it is judged that outputting is not done to one side of a sheet (NO at step S21), a judgment is made as to whether a reading sequence has been set by the user through the operation section 15 (at step S23). In the case that it is judged that a reading sequence has been set by the user (YES at step S23), the reading sequence having been set by the user is used as the reading sequence (at step S24). The reading sequence being set at this step is stored in the storage section 14. In the case that no reading sequence has been set by the user (NO at step S23), the control section 11 checks the information stored in the storage section 14 to judge whether a preceding setting value is present (at step S25). In the case that it is judged that a preceding setting value, is present (YES at step S25), the preceding setting value is used as the reading sequence (at step S26). In the case that it is judged that no preceding setting value is stored in the storage section 14 (NO at step S25), the control section 11 sets the setting value of the reading sequence to a predetermined reading sequence (for example, the counterclockwise sequence starting from the upper left corner of the manuscript table 1) (at step S27). The reading sequence being set at this step is stored in the storage section 14.

The description of the processing is returned to the flowchart shown in FIG. 8. After the control section 11 has set the reading sequence, manuscript reading is carried out according to the reading sequence having been set (at step S15). In other words, the control section 11 scans a manuscript to be read, using the manuscript reading section 12, and obtains the image data of the manuscript. Next, the control section 11 judges whether all the manuscripts have been read (at step S16). Because the control section 11 counts the number of manuscripts at step S12, the judgment as to whether all the manuscripts have been read can be made by counting the number of the manuscripts having been read. In the case that it is judged that not all the manuscripts have been read (NO at step 16), the control section 11 returns the processing to step S15, and the manuscript reading processing continues.

Figure 10:
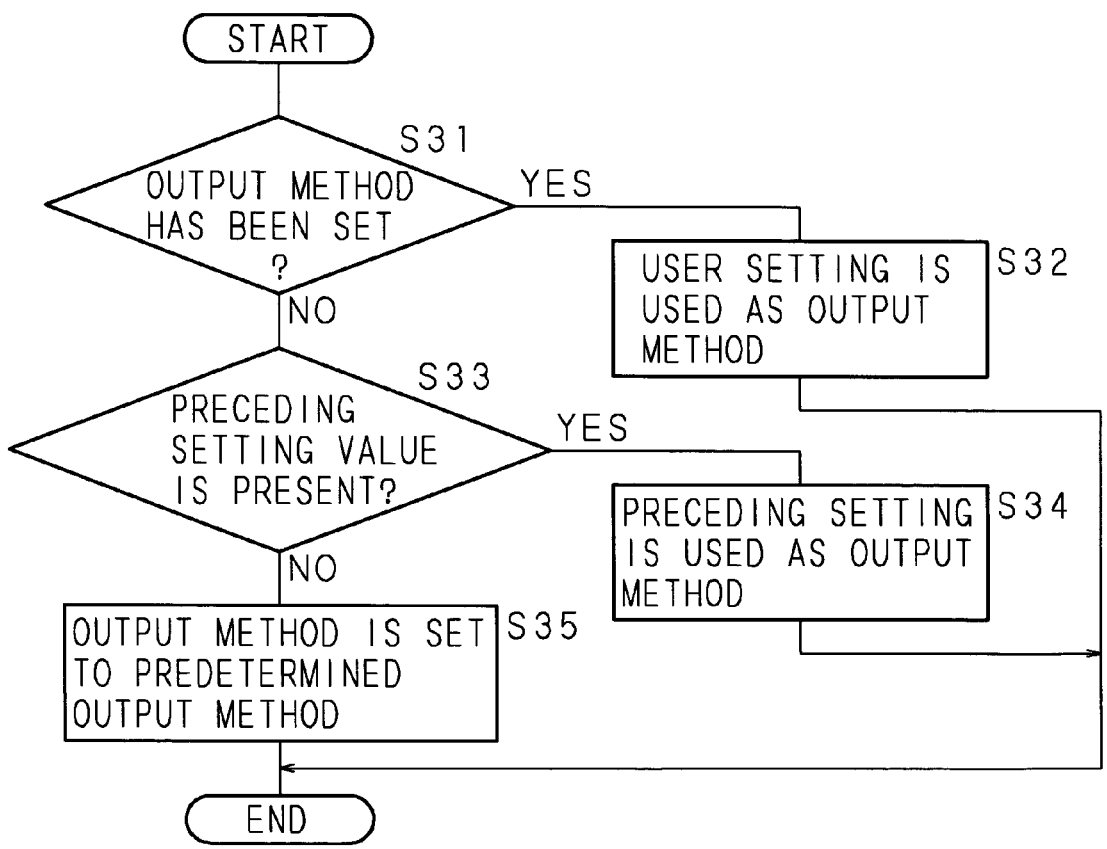
FIG. 10 is a flowchart showing the processing for setting an output method.

In the case that it is judged that all the manuscripts have been read (YES at step S16), the control section 11 sets an output method (at step S17). FIG. 10 is a flowchart showing the processing for setting an output method. In the processing for setting an output method, a judgment is made as to whether an output method has been set by the user through the operation section 15 (at step S31). In the case that it is judged that an output method has been set by the user (YES at step S31), the output method having been set by the user is set as the output method (at step S32). The output method being set at this step is stored in the storage section 14. In the case that no output method has been set by the user (NO at step S31), the control section 11 checks the information stored in the storage section 14 to judge whether a preceding setting value is present (at step S33). In the case that it is judged that a preceding setting value is present (YES at step S33), the preceding setting value is set as the output method (at step S34). In the case that, it is judged that no preceding setting value is stored in the storage section 14 (NO at step S33), the control section 11 sets the setting value of the output method to a predetermined output method (for example, outputting to one side of a sheet) (at step S35). The output method being set at this step is stored in the storage section 14.

The description of the processing is returned to the flowchart shown in FIG. 8. After the control section 11 has set the output method, the output processing is carried out according to the output method having been set (at step 18). Furthermore, in the case that it is, judged that a plurality of manuscripts are not placed on the manuscript table 1 on the basis of the number of manuscripts counted at step S12 (NO at step S13), the control section 11 controls the manuscript reading section 12 to carry out ordinary manuscript reading (at step S19), and then output processing is carried out (at step S18).

In the flowchart shown in FIG. 8, in the case that a plurality of manuscripts are placed on the manuscript table 1, the manuscript reading processing is repeated a plurality of times to read the images, of all the manuscripts. However, it may also be possible that the whole area of the reading face of the manuscript table 1 is read by carrying out scanning only once and that image processing is performed to clip the image of each manuscript. Any known method can be used as a method for clipping the image of each manuscript. Even in this case, because the manuscripts are placed on the manuscript, table 1 so that the ends of the respective manuscripts are aligned, with the fringes of the manuscript table 1, there is little possibility that the manuscripts are placed in a skew state. Hence, it is impossible to omit skew correction or the like, and the CPU source is prevented from being occupied.

Figure 11:
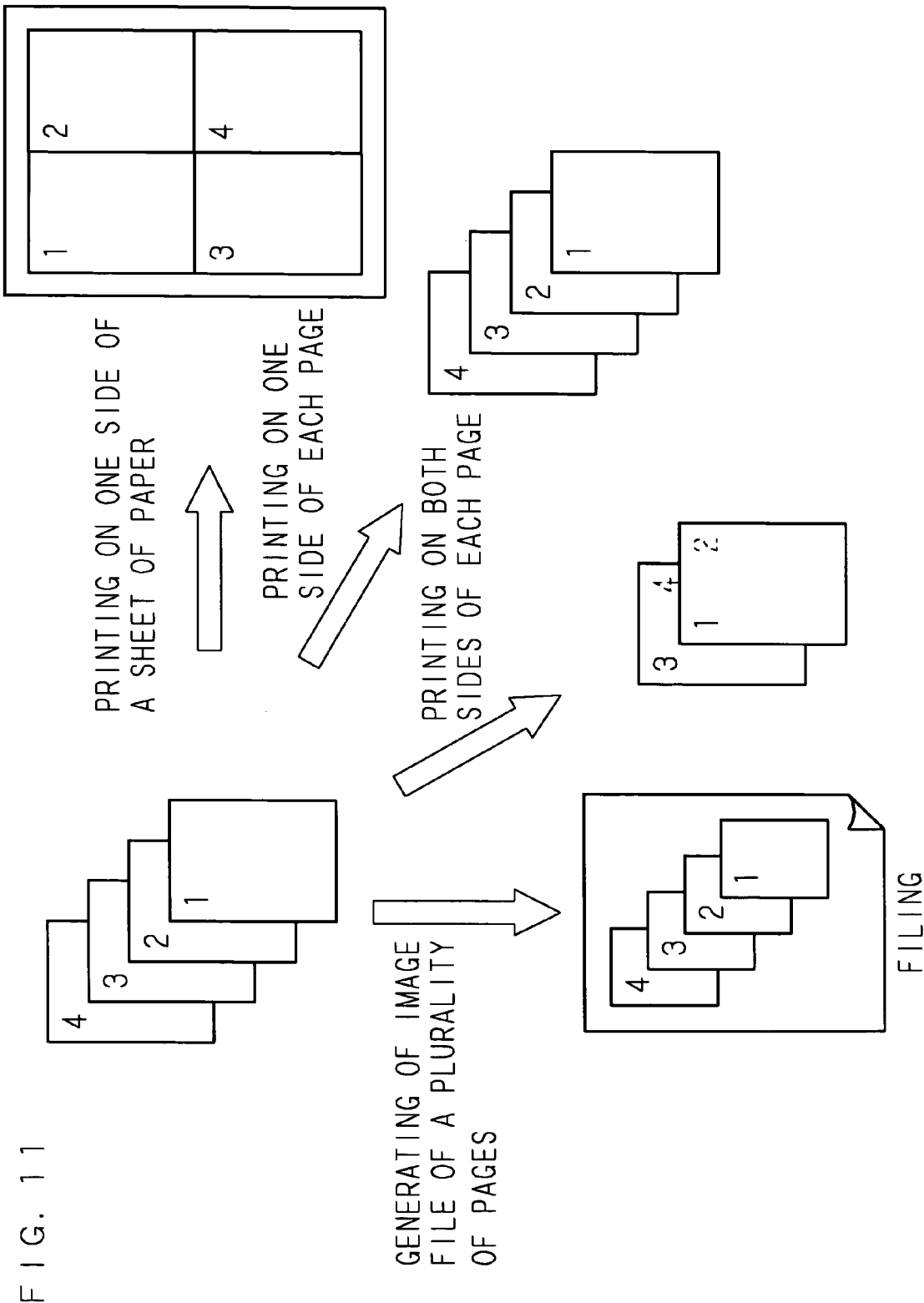
FIG. 11 is an explanatory view showing an example of the output processing that is carried out by the digital combined apparatus.

FIG. 11 is an explanatory view showing an example of the output processing that is carried out by the digital combined apparatus. FIG. 11 shows an example of output processing that is carried out in the case that a plurality of manuscripts are placed on the manuscript table 1 and that the images of the respective manuscripts are read as individual images. This embodiment is configured so as to be able to carry out printing on one side of a sheet of paper, printing on one side of each page, printing on both sides of each page, and generation of image files of a plurality of pages. In a default setting, printing on one side of each page is carried out, for example. In, the case that a new setting is received through the operation section 15, the output processing according to the setting is carried out.

This embodiment is configured so that the four manuscript detection sensors S1 and S4 and the four manuscript size detection sensors P1 to P4 are used to detect the number of manuscripts placed on the manuscript table 1 and the placement states of the manuscripts. However, the numbers of the sensors are not limited to those numbers. Furthermore, it is not always necessary to use two kinds of sensors, but the embodiment may also be configured using only, one kind of sensors (for example, manuscript detection sensors) to detect the number of manuscripts and the placement states of the manuscripts.

The invention claimed is:

1. An image reading apparatus capable of reading images by a plurality of reading methods, comprising:
    a manuscript table on which a plurality of manuscripts are placed;
    a plurality of detectors detecting placement states of the manuscripts placed on said manuscript table;
    a controller selecting between a first reading method in which the manuscripts are read as one image and a second reading method in which the respective images of the manuscripts are individually read according to the placement states detected by said respective detectors and reading the images by the determined reading method,
    wherein when a placement state which a plurality of manuscripts are placed so as to make contact each other is detected, the first reading mode is selected, when a placement state which a plurality of manuscripts are placed so as to be separated from each other is detected, the second reading mode is selected.

2. The image reading apparatus according to claim 1, wherein:
    the plurality of detectors comprising a first manuscript detector, a second manuscript detector, a third manuscript detector, and a fourth manuscript detector, the first manuscript detector is located halfway between a left end and a right end of the manuscript table, and the first manuscript detector is located at a quarter of a distance from a upper end to a lower end of the manuscript table,
    the second manuscript detector is located halfway between the upper end and the lower end of the manuscript table, and the second manuscript detector is located at a quarter of a distance from the left end to the right end of the manuscript table,
    the third manuscript detector is located halfway between the left end and the right end of the manuscript table, and the third manuscript detector is located at a quarter of a distance from the lower end to the upper end of the manuscript table, and
    the fourth manuscript detector is located halfway between the upper end and the lower end of the manuscript table, and the fourth manuscript detector is located at a quarter of a distance from the right end to the left end of the manuscript table.

3. The image reading apparatus according to claim 2, further comprising:
    a plurality of manuscript size detectors for detecting a size of the one or more manuscripts, the plurality of manuscript size detectors comprises a first manuscript size detector, a second manuscript size detector, a third manuscript size detector, and a fourth manuscript size detector.

4. The image reading apparatus according to claim 3, wherein the first manuscript size detector is located at the upper end of the manuscript table, the second manuscript size detector is located at the left end of the manuscript table, the third manuscript size detector is located at the lower end of the manuscript table, and the fourth manuscript size detector is located at the right end of the manuscript table.

5. An image reading apparatus capable of reading images by a plurality of reading methods, comprising:
    a manuscript table on which a plurality of manuscripts are placed;
    a reading section for reading images from the manuscripts placed on said manuscript table;
    a plurality of detecting sections for detecting placement states of the manuscripts placed on said manuscript table; and
    a controller:
    selecting between a first reading method in which the manuscripts are read as one image and a second reading method in which the respective images of the manuscripts are individually read based on the placement states detected by said respective detecting sections; and
    causing said reading section to read the images of the manuscripts by the determined reading method,
    wherein when a placement state which a plurality of manuscripts are placed so as to make contact each other is detected, the first reading mode is selected, when a placement state which a plurality of manuscripts are placed so as to be separated from each other is detected, the second reading mode is selected.

6. The image reading apparatus according to claim 5, wherein said manuscript table has a rectangular shape, and said detecting sections are provided to detect manuscripts placed near the respective corners of said manuscript table.

7. The image reading apparatus according to claim 1, wherein said controller further performs an operation of specifying the number of manuscripts placed on said manuscript table based on the detection results of said respective detecting sections.

8. The image reading apparatus according to claim 1, further comprising a storing section for storing a manuscript reading sequence, and
said controller further performs an operation of causing said reading section to read the images of manuscripts according to the reading sequence stored in said storing section when a plurality of manuscripts are placed on said manuscript table.

9. The image reading apparatus according to claim 1, further comprising a receiving section for receiving a setting of the manuscript reading sequence, and
said controller further performs an operation of causing said reading section to read the images of manuscripts according to the setting received at said receiving section when a plurality of manuscripts are placed on said manuscript table.

10. The image reading apparatus according to claim 1, wherein some of said detecting sections detect the dimensions of the manuscripts placed on said manuscript table.

11. An image recording apparatus comprising:
said image reading apparatus according to claim 1; and
a recording section for recording images read by said image reading apparatus on a sheet.

12. The image recording apparatus according to claim 11, further comprising:
a storing section for storing the recording method that is used to record the images, wherein
the controller performs an operation of causing said recording section to record the images by the recording method stored in said storing section.

13. The image recording apparatus according to claim 12, wherein said recording method is one of a method for recording an image on one side of a sheet, a method for recording a plurality of images on one side of a sheet, a method for recording images on both sides of a sheet, and a method for recording images as data.

14. The image recording apparatus according to claim 11, further comprising:
a receiving section for receiving a setting of the recording method that is used to record the images; and
the controller performs an operation of causing said recording section to record the images according to the setting received at said receiving section.

15. The image reading apparatus according to claim 5, wherein:
the plurality of detecting sections comprising a first manuscript detecting section, a second manuscript detecting section, a third manuscript detecting section, and a fourth manuscript detecting section,
the first manuscript detecting section is located halfway between a left end and a right end of the manuscript table, and the first manuscript detecting section is located at a quarter of a distance from a upper end to a lower end of the manuscript table,
the second manuscript detecting section is located halfway between the upper end and the lower end of the manuscript table, and the second manuscript detecting section is located at a quarter of a distance from the left end to the right end of the manuscript table,
the third manuscript detecting section is located halfway between the left end and the right end of the manuscript table, and the third manuscript detecting section is located at a quarter of a distance from the lower end to the upper end of the manuscript table, and
the fourth manuscript detecting section is located halfway between the upper end and the lower end of the manuscript table, and the fourth manuscript detecting section is located at a quarter of a distance from the right end to the left end of the manuscript table.

16. The image reading apparatus according to claim 15, further comprising:
a plurality of manuscript size detecting sections for detecting a size of the one or more manuscripts, the plurality of manuscript size detecting sections comprises a first manuscript size detecting section, a second manuscript size detecting section, a third manuscript size detecting section, and a fourth manuscript size detecting section.

17. The image reading apparatus according to claim 16, wherein the first manuscript size detecting section is located at the upper end of the manuscript table, the second manuscript size detecting section is located at the left end of the manuscript table, the third manuscript size detecting section is located at the lower end of the manuscript table, and the fourth manuscript size detecting section is located at the right end of the manuscript table.

* * * * *